United States Patent [19]

Jackson et al.

[11] 4,181,948

[45] Jan. 1, 1980

[54] COMPUTER DIRECTED MANUAL SORTING AID

[75] Inventors: William A. Jackson, Lewisville; Hubert C. Jones, Jr., Austin, both of Tex.

[73] Assignee: Electronic Data Systems Corporation, Dallas, Tex.

[21] Appl. No.: 803,862

[22] Filed: Jun. 6, 1977

[51] Int. Cl.[2] .......................... G06F 15/24; B07C 5/10

[52] U.S. Cl. .................................... 364/478; 209/525; 209/549; 364/400

[58] Field of Search ........................ 364/400, 478, 900; 209/524, 525, 530, 546, 549, 706

[56] References Cited

U.S. PATENT DOCUMENTS

| | | | |
|---|---|---|---|
| 3,260,999 | 7/1966 | Grammer | 364/900 |
| 3,829,844 | 8/1974 | Zonneveld et al. | 364/900 |
| 3,889,811 | 6/1975 | Yoshimura | 209/549 |
| 3,993,193 | 11/1976 | Welch et al. | 209/549 |

*Primary Examiner*—Felix D. Gruber
*Attorney, Agent, or Firm*—Martin Faier; Eugene F. Friedman

[57] ABSTRACT

A device for the purpose of providing computerized direction and control in the process of manually sorting documents. A sorting bin is provided containing compartments into which documents are placed to effect the sort. The sorting bin is contained within a sorting console which also houses a power supply; an indicator and document detector array; a control unit which monitors the document detectors, operates the indicators, and communicates with a computer; and control switches and indicators.

An operator sorts documents by depositing them one at a time into a selected compartment of the sorting bin. The control unit, under computer direction, indicates to the operator the correct compartment for depositing each document, by illuminating indicators associated with the proper compartment. Document detectors inform the control unit when a document is deposited in any compartment. When a document is deposited in an incorrect compartment, an alarm alerts the operator.

Depositing a document in the correct compartment turns off the indicators associated with that compartment and enables the control unit to select the compartment for the next document.

When the number of sorted documents approaches the capacity of the sorting bin, the full bin may be removed from the sorting console and replaced with an empty bin.

23 Claims, 5 Drawing Figures

COMPUTER DIRECTED MANUAL SORTING AID

SUMMARY OF THE INVENTION

This invention is intended to provide a method by which the manual sorting of documents can be augmented and aided by computer. Such augmentation will relieve the person performing the sort from the decision making task, thereby allowing concentration on the manipulation of the documents or on ancillary operations that must proceed simultaneously with the sorting process. Both visual and audible signaling devices are used to direct the operator in the performance of the sort and thus significantly reduce the probability of sorting errors when compared to the case in which this direction is not provided.

In particular, the apparatus to be described is well suited to activities or processes in which the documents to be sorted contain data which must be manually extracted and entered into a computer for processing. The apparatus allows the sorting and data capture operations to be integrated and performed simultaneously by the same operator.

Current devices which perform the data capture and sorting operation are typically highly automated mechanisms which must be capable of "reading" or otherwise extracting information directly from the documents. These devices must rely on such machine readable formats as punched cards, magnetic ink characters, or elaborate electronic character recognition schemes. Rigid specifications on the size, shape, and dimensional stability of the documents typically must be met.

Movement of the documents through these sorting devices is typically regulated by complex mechanical configurations involving closely machined parts; rollers, cams, gears, belts, vacuum valves and fittings. Timing can be critical, and the mechanisms are subject to jamming by creased or torn documents, staples, or other foreign material. Jams can frequently result in completely destroyed documents.

Because of the complex mechanisms and critical timing, these devices require frequent maintenance by skilled technicians.

While the completely automated mechanisms have many advantages and are widely accepted in the data processing industry, many of the above disadvantages are eliminated or overcome by the proposed invention. This invention can be useful in document sorting applications when the number of document classes or categories is small and when the criteria for sorting is predetermined. Under these circumstances, the invention can offer the following advantages:

1. The invention contains no moving parts and is constructed of simple, low cost materials.
2. The invention is not required to read the document, and does not depend on machine readable data formats.
3. The invention eliminates complex mechanisms required for controlling document motion. Maintenance requirements and down time are significantly reduced.
4. The invention eliminates the requirement of special paper or cards for documents. Document dimensions are not critical.
5. The invention is not subject to paper jams with resultant destruction of documents.

It should be noted that the purpose of the invention is not to actually sort documents, rather, it is to augment the manual sorting of documents by the operator. By augmenting the manual sort with the decision making capabilities of an electronic digital computer and thus directing the operator through the sorting process, sorting errors are significantly reduced or eliminated. Under these circumstances and limitations, use of the invention in lieu of the completely automated document sort can be justified.

The present invention consists of a sorting console containing a sorting bin and equipped with indicators for directing the operator, sensors for detecting documents, and a control unit responsible for communicating with a computer, reacting to sensor signals, and activating the indicators in response to computer commands. The sorting bin is divided into a number of compartments for collecting the sorted documents.

Since the invention is intended to be operated as a computer peripheral device, it is required that it be interfaced with a computer, and that a computer program be provided capable of controlling the device, accepting document codes as input, associating a given document code with a specific compartment of the sorting bin, and issuing appropriate commands to the control unit. In addition, a method of entering document codes into the computer must be provided, such as a conventional manual keyboard.

The interface between the control unit of the document sorting aid and the computer is conventional, and is typically a serial data path.

A single document sorting aid, operating at maximum speed, would make very limited demands on a modern digital computer; a number of them can easily be controlled simultaneously by a computer in the minicomputer or microcomputer class.

DESCRIPTION OF THE DRAWINGS

For a better understanding of the features of the invention and its use, reference is made to the following detailed description to be read with reference to the accompanying drawings, wherein.

DETAILED DESCRIPTION

Figure 1:
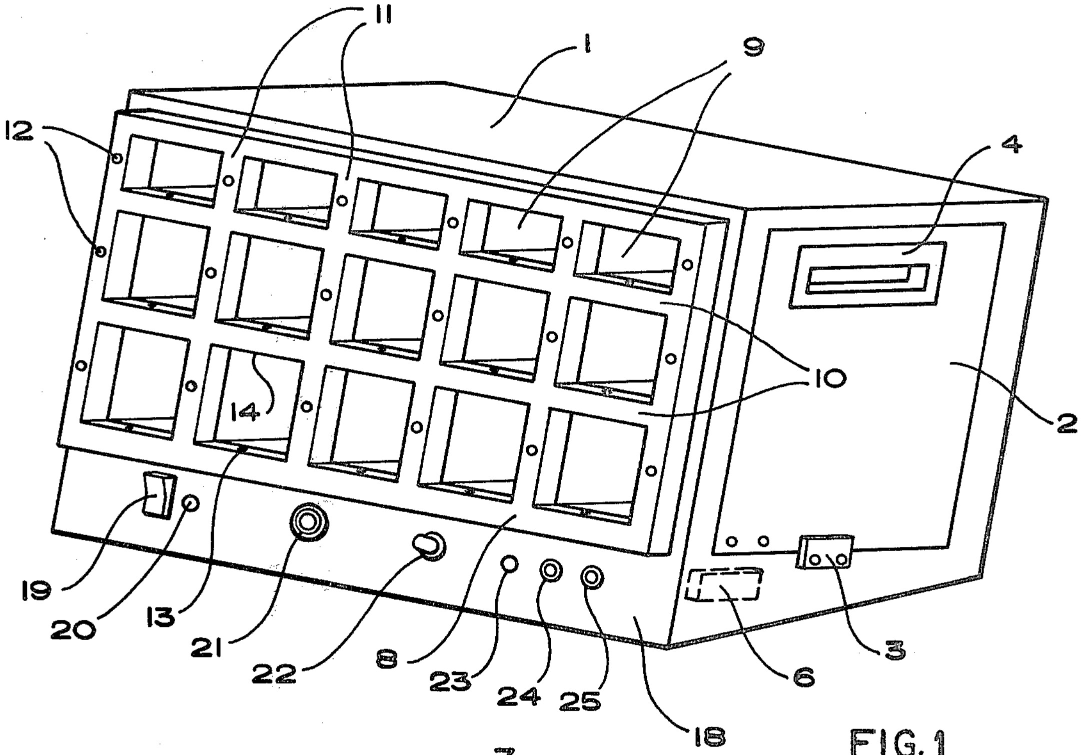
FIG. 1 is an illustration of a particular embodiment of the invention incorporating fifteen sorting compartments and depicting both the sorting console with a sorting bin in place.

FIG. 1 illustrates a possible embodyment of the invention. As depicted, the sorting aid can be used to sort documents of customary coupon, check or ticket dimensions.

The device consists of a sorting console 1 which houses the control unit and associated electronics, the detector array, indicators, control switches, and a removable sorting bin 2. The sorting bin 2 is inserted and removed, drawer-like, from the end of the sorting console 1. A removable stop 3, shown positioned on the right end of the console, provides for proper positioning of the sorting bin 2 within the console 1. This stop 3 can alternatively be positioned on the left end of the console. In either case, the sorting bin 2 is inserted or removed from the console end opposite the end on which the stop 3 is mounted.

Figure 1A:
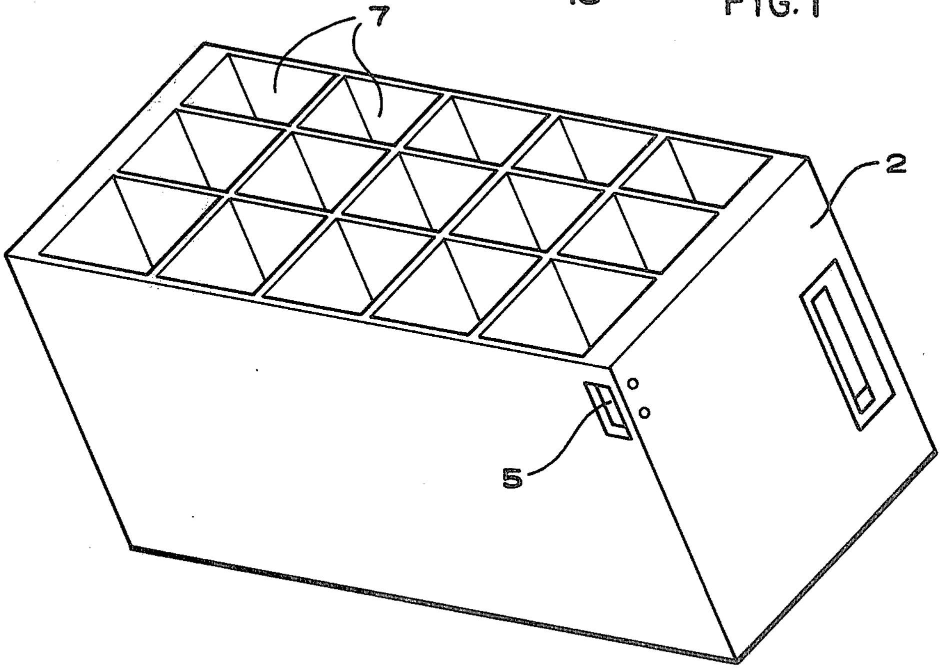
FIG. 1A shows a spare sorting bin for use with the sorting console of FIG. 1.

FIG. 1A illustrates a spare sorting bin 2 pictured outside the console. Each sorting bin 2 is equipped with a pair of recessed handles 4 for easy handling. A permanent magnet 5 is located in the lower right front corner of the sorting bin 2 and is positioned such that when the sorting bin 2 is properly situated within the sorting console 1, a magnetically operated proximity switch 6, shown in phantom in FIG. 1, furnishes a positive indication to the control unit that the sorting bin 2 is in place.

The sorting bin 2 is divided into three rows of five sorting compartments 7 for a total of fifteen compartments. The width and depth of each compartment 7 is in general determined by the dimensions of the documents to be sorted, with suitable provision for clearance. In the illustrated instance the width is approximately four and one-half inches and the depth is approximately eight and one-half inches. The required vertical dimension of each compartment 7 is primarily determined by the expected volume of the documents in the document class assigned to the compartment.

In the case illustrated by FIG. 1, the vertical dimensions for a compartment varies according to the row. That is, the compartments on the bottom row are all approximately four and one-half inches vertically, those on the middle row are all approximately three and one-half inches, while those on the top row are all approximately three inches vertically. It will be noticed that this allows for some variability in the expected volume of documents according to class.

When preparing a table of document codes versus document class for use by the computer, those codes belonging to classes with the highest expected volumes are assigned to compartments along the bottom row, and those codes belonging to classes with the lowest expected volumes are assigned to compartments along the top row. Intermediate volumes are assigned to compartments in the middle row.

The compartment assignment process is further refined within a row by assigning a class with the highest expected volume to the right most compartment, and proceeding to the left assigning compartments in order of decending expected volume.

Note that by adhering to the above assignment rules and positioning the sorting console 1 on a worktable to the left of the operator, the compartments assigned higher volumes are located closest to the operator's left hand, thus reducing the motion time required for the sorting operation.

It should also be noted that the use of smaller compartments for classes with lower expected volumes and larger compartments for classes with larger expected volumes provides for an efficient use of available space while increasing the interval between required clearing or "sweeping" of the sorting bin 2.

Clearing or sweeping of sorting bins is required periodically, and the period depends on the rate that documents are processed and on the distribution of the number of documents per class. Sweeping is performed by simply removing a full or nearly full bin, and replacing it with an empty bin.

The detector and indicator array 8 is positioned in front of the sorting bin 2 such that the openings 9 in the array align with the compartments 7 of the bin. The array 8 consists of four horizontal channels 10 and six vertical channels 11. These channels are open to the rear (toward the sorting bin). Indicator lamps 12 (VLEDs, or visible light emitting diodes) are mounted in the vertical channels. One indicator lamp 12 is mounted on each side of each array opening 9 so that it is located approximately midway along the vertical length of a compartment 7 of the sorting bin 2. Each indicator lamp 12 is visible from the operators position. The control unit illuminates indicator lamps 12 in pairs to designate that a particular compartment of the sorting bin has been selected. Thus to indicate that compartment two (second compartment from left, top row) has been selected, the control unit would cause the second and third (again from the left) indicator lamps in the top row to be illuminated. Compartment selection is discussed in more detail later.

Using a pair of indicator lamps 12 to designate a specific compartment requires a total of 18 lamps for 15 compartments; however this permits a completely unambiguous indication of the compartment selected.

Figure 2:
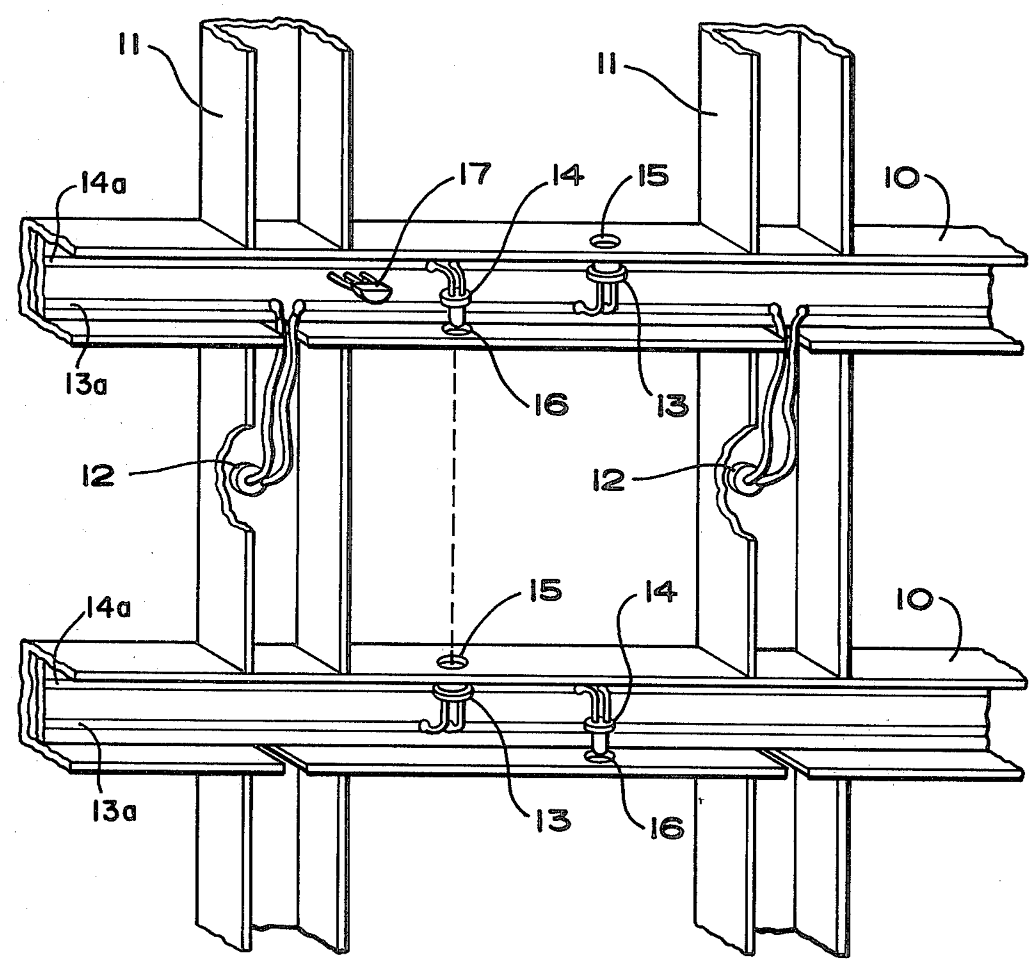
FIG. 2 presents a more detailed view of a single element of the document detector array and the components thereof.

The horizontal channels 10 of the array 8 each house a printed circuit on which document detectors are mounted. Each opening 9 in the array 8 is equipped with a document detector. FIG. 2 presents a view from the rear of an array opening 9 and details the elements of a document detector. A detector consists of an emitter 13 element connected to the printed lead 13*a* and a sensor 14 element connected to the printed lead 14*a*. Both are conventional electronic components.

The emitter 13 is an infra-red light emitting diode. When energized, it projects an invisible beam of light vertically. This beam passes through the hole 15 in the lower channel, crosses the array opening, enters the hole 16 in the upper channel, and strikes the sensor 14. The sensor 14 is a phototransistor which conducts current much more readily when illuminated by the beam from the emitter 13 than when it is not so illuminated. The upper channel 10 shrouds the phototransistor 14 and thus minimizes the effects of ambient light. Current from the phototransistor is amplified by the conventional transistor 17 before being routed as a signal to the control unit at the rear of the console.

Refer again to FIG. 1. The phototransistor sensor, initially illuminated by the beam from the emitter, is turned on and is thus conducting heavily. When a document is placed in a compartment 7, it must pass through an opening 9 of the array 8. In doing so, it interrupts the light beam between the emitter and the sensor for the compartment. When the beam is interrupted by the document, the phototransistor turns off. It turns on again when the beam is reestablished as the document passes completely through the opening into the compartment. The result is that a positive voltage pulse is sent to the control unit. The leading edge of this pulse represents the document entering the opening; the trailing edge of the pulse represents the document clearing the opening. The pulse maintains a positive level while the document interrupts the beam. Thus a pulse signals the control unit each time a document is deposited in a compartment.

It should be noted that the above description of the operation of the document detector presents the continuous mode of operation. In this mode, all emitters are constantly energized and the sensors are monitored asynchronously and simultaneously by the control unit.

A second mode, in which all of the emitters are simultaneously pulsed with high frequency, short duration pulses would be more energy conservative. All emitters would be energized, and thus emitting a beam, only for the duration of the energizing pulse. They would be turned off for the time between pulses. By making the pulse duration short compared to time between pulses (low duty cycle), only a fraction of the continuous mode power would be required for the pulsed mode. However, this mode would require that the sensor signals be gated in synchronism with the pulses that energize the emitters, and thus monitored only for the duration of each energizing pulse. In addition, for reasons to be explained later, the control unit logic would need to recognize the event when a detector beam is restored after being interrupted for one or more energizing pulses. Note that the pulse repetition rate of the energizing pulses should be great enough that it would be impossible to insert a document into a compartment between pulses.

A logical extension of the ideas presented in the pulsed mode above provides the multiplexed mode. In the multiplexed mode, the fifteen detectors are sequentially scanned in rotation. Only a single emitter is enabled for by a given energizing pulse, and only the sensor associated with the energized emitter is monitored. The next sequential energizing pulse would be addressed to the emitter/sensor pair next in the scanning order. Scanning would thus proceed from the first detector in the scanning order, through each in turn to the last, thence back to the first for a new scanning cycle.

Of course other techniques are available, such as scanning a row or a column of detectors in parallel. Each method will have advantages and disadvantages, but, in general, pulsed operation is power conservative, while continuous operation does not require synchronization and careful timing of signals, and thus can be implemented with simpler control logic. Alignment procedures can also be much simpler for the continuous mode.

Pulsed operation does offer a distinct advantage for IRLED emitters, however, since the power disipation of these devices is limited. Thus a much more intense light beam can be generated with the pulsed mode than with the continuous mode and still remain within the power dissipation limitations of the IRLED.

It should also be noted that devices other than the IRLED/phototransistor combination might be used as detector elements. For instance, an incandescent lamp/photoresistor combination might serve as well, particularly in the continuous mode of operation. However, the expected failure rate of this combination would probably be greater than that of the IRLED/phototransistor.

Hereafter, discussion of the detectors will assume the continuous mode of operation unless otherwise stated.

Referring again to FIG. 1, the control panel 18 of the sorting console 1 is located at the base of the console below the indicator/detector array 8. A power switch 19 is located on the left of the control panel 18, and controls the A.C. power source for the sorting aid. A VLED power on indicator 20, located immediately to the right of the switch, is illuminated when power is available to the control unit. An audio signaling device 21, also located on the control panel emits a tone of approximately 2900 hertz when energized by the control unit. The alarm lamp 22, located to the right of the audio device, is an incandescent lamp with a red lens which can be caused to blink at approximately one hertz by the control unit. The ready indicator 23 is a VLED and is illuminated to indicate when the control unit is in the ready state.

The ready switch 24 is a normally open, momentary contact push button switch. When the sorting bin 2 is properly positioned within the console 1, depressing and releasing the ready switch 24 will cause the control unit to enter the ready state. Additionally, the ready switch 24 functions to disable the audio signaling device 21 as long as it is held depressed. This feature allows the operator to temporarily inhibit the audio signal when it is necessary to withdraw a document or group of documents from the sorting bin for reexamination.

The not-ready switch 25 is also a normally open, momentary contact pushbutton switch. Depressing and releasing this switch causes the control unit to assume the not-ready state.

Figure 3:
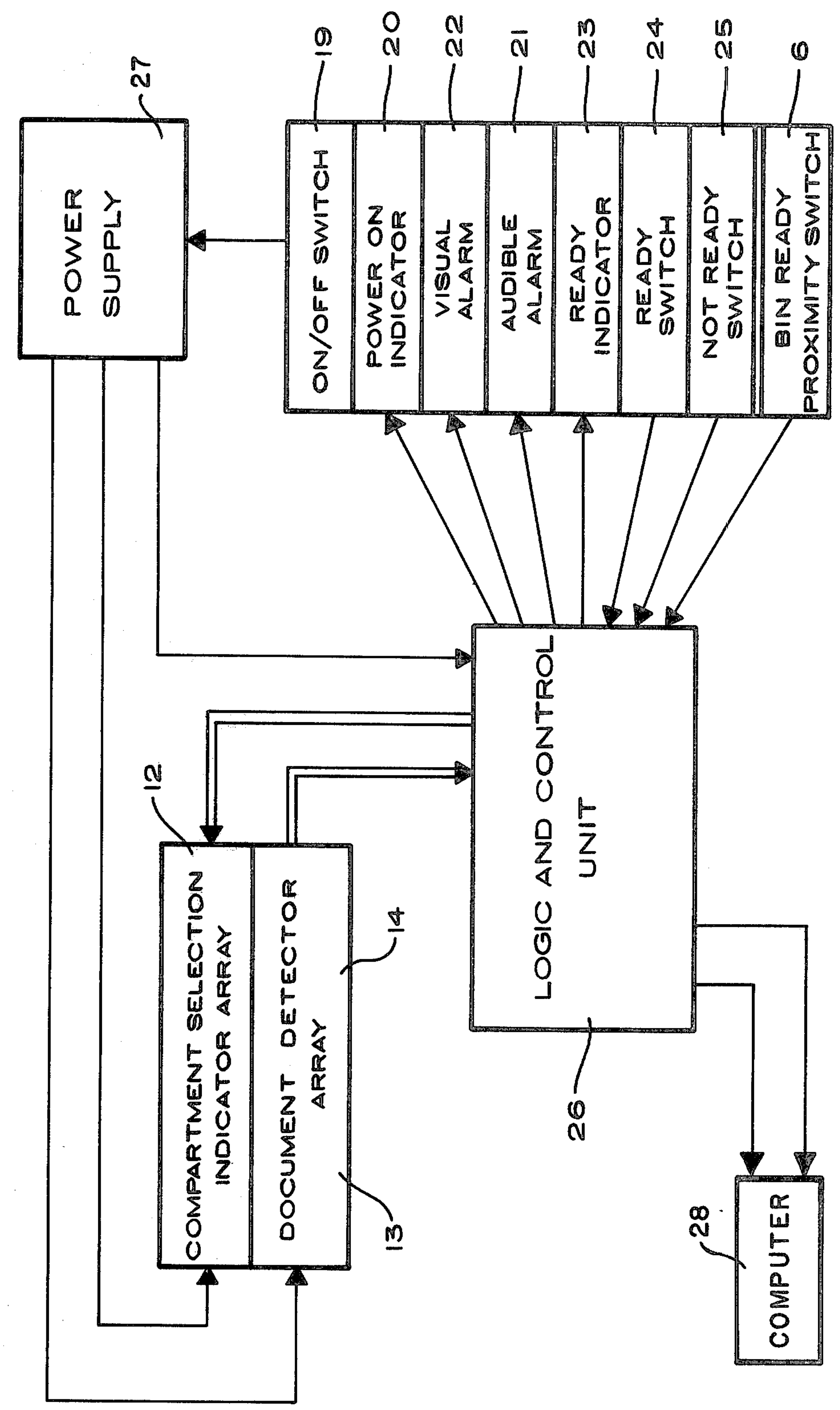
FIG. 3 is a block diagram of the functional elements of the invention and the interrelationships thereof.

FIG. 3 presents a schematic diagram of the essential elements of an operating sorting aid. The control unit 26 receives its energy from the power supply 27, coordinates the functions of the other system elements and communicates with the computer 28. Logic functions within the control unit 26 are implemented with conventional 7400 series TTL integrated circuits, although other logic families such as CMOS might be used as well. A microprocessor could also be used to implement the required logic functions.

To the control unit 26, the sensor 14 elements of the document detectors appear logically as a parallel group of fifteen data bits, with each bit corresponding to a particular compartment 7 of the sorting bin 2. All bits of the group are normally at a logic zero level, indicating that no detector beam is obstructed. When a document is deposited into a particular compartment, the bit corresponding to that compartment goes to a logical one state as the detector beam is interrupted, then returns to a logical zero state when the beam is restored.

Each compartment of the sorting bin can assume one of two logical states: Selected or Not-Selected. Only one compartment at a time can assume the Selected state. The control unit places a compartment in the Selected state (selects a compartment) only on direction from the computer. The control unit will return a selected compartment (i.e., a compartment in the Selected state) to the Not-Selected state either on direction of the computer or when the data bit corresponding to the selected compartment goes from a logical zero to a logical one and returns to a logical zero. Note that the latter indication is received by the control unit when a document is deposited in the selected compartment. Returning a selected compartment to the Not-Selected state is referred to as "clearing" the selected compartment.

Assume that all fifteen compartments are in the Not-Selected state. Under this condition, if any of the document detector bits goes to a logical one, the control unit immediately activates the alarm signal. Activating the alarm signal causes the front panel arm lamp 22 to begin blinking. In addition, the audio signaling device 21 is activated, provided it is not disabled by holding the Ready switch 24 depressed. Thus the operator is provided with a positive alarm indication (both aurally and visually) in the event that a document is deposited in any compartment when none of the compartments are in the Selected state. The control unit deactivates the alarm under these circumstances as soon as the interrupted detector beam is restored.

When the control unit places a compartment in the Selected state, the following takes place:

1. Two indicator lamps, one on either side of the selected compartment, are illuminated, thus advising the operator of the selected compartment.
2. Logic circuits are armed which reroute any signal from the document detector sensor 14 element corresponding to the selected compartment such that the signal is prevented from activating the alarm. Instead, the signal is gated to cause it to clear the selected compartment.
3. Logic circuits are armed such that when a signal is received from the document detector sensor of either of the compartments which are in the Not-Selected state, the alarm signal is latched in the activated state. When thus activated, the alarm signal can only be de-activated by clearing the selected compartment.

Now assume that one of the compartments has been placed in the Selected state. The operator determines the selected compartment by observing the two illuminated indicator lamps 12. If the operator now deposits a document into the selected compartment, the selected compartment is returned to the Not-Selected state and the two indicator lamps are extinguished, giving a positive indication to the operator of a correct maneuver.

Alternatively, assume that with one of the compartments in the selected state, the operator starts to deposit a document into one of the compartments not in the Selected state. As soon as the detector beam of the un-selected compartment is interrupted, the alarm signal is latched on, causing the alarm lamp to begin blinking and the audio signaling device to sound. Typically, this alarm signal will be noticed by the operator before releasing the document. When the document is placed in the selected compartment, the alarm is de-activated and the selected compartment is cleared.

For communications between the computer and the control unit, any of several conventional interfacing techniques might be used, depending on the choice of the particular computer used and on the expected operating environment. A typical configuration and communications protocol will be described to illustrate the type of functions performed over the interface.

The actual hardware interface between the computer and the control unit in the illustrated instance is a twisted pair line utilizing differential line drivers and receivers at each end. This line forms a serial data path over which the computer may transmit Command words to the control unit and poll the control unit for Status words. The control unit responds to a Command by attempting to execute the Command and by initializing for responding to a poll. Provided that a valid Command word has been received and recognized by the control unit, it will respond to a poll by transmitting a Status word to the computer.

Four Commands are used by the computer to direct the control unit:

1. Select—Instructs the control unit to place a particular compartment in the Selected state. The number of the compartment to be selected is contained within the command.
2. Clear—Instructs the control unit to place a previously Selected compartment (if any) in the Not-Selected state. No compartment number is required for this command.
3. Clear and Select—Instructs the control unit to first Clear a previously selected compartment and to then Select a compartment. The number of the compartment to be Selected is contained within the command.
4. No-op—This is a null command in that it does not direct the control unit to perform a function. However, as with the other three commands, the No-op causes the control unit to initialize for responding to a poll. This command would be used by the computer to obtain status information from the control unit without altering the state of any compartment.

As previously stated, the receipt of any Command causes the control unit to initialize for response to a polling signal from the computer. Thus if the computer follows a Command word with a polling signal, the control unit will answer with a Status word. After transmitting the Status word to the computer, the control unit will ignore any other polling signals until it receives and recognizes another valid Command word.

There are four possible status responses that the control unit can use to convey information to the computer:

1. Not-Ready—This status is returned for any command when the control unit is in the Not-Ready state, regardless of whether a compartment is in the Selected State. Commands received while the control unit is in the Not-Ready state are not executed by the control unit, but they will still enable a Status response.
2. Good—This status is returned to indicate that the previous Command was properly executed by the control unit. Thus, after a Select or a Clear and Select command, Good status indicates that the compartment identified by the Command is now in the Selected state and all other compartments are in the Not-Selected state. After a Clear Command or a No-op Command, Good status indicates that all compartments are in the Not-Selected state.
3. Busy—This status is returned to indicate that a previously Selected compartment has not yet been cleared. In response to a No-op or a Select Command, Busy status simply indicates that the operator has not yet deposited a document in the compartment selected by an earlier Command. The state of all the compartments remain unchanged. However, when Busy status is returned in response to a Clear or a Clear and Select Command, this indicates that the control unit attempted to clear a previously selected compartment, but the attempt failed. This condition arises when a document deposited in the selected compartment does not completely clear the document detector beam. That is, a portion of the document remains extending through the array opening such that the detector beam is continuously obstructed.

Note that for a document to clear a selected compartment, the detector beam is first obstructed, then restored. The actual clearing operation takes place as the beam is restored after being obstructed.

When a document is obstructing the detector beam as described above, it also inhibits a computer directed clearing of the selected compartment. Thus, Busy status returned in response to a Clear or a Clear and Select Command advises the computer of this undesirable condition.

4. Invalid—This status is returned only in response to a Select or a Clear and Select Command. It indicates that the number of the compartment to be selected was outside the range of the number of compartments controlled by the control unit. While the Sorting Aid being described contains fifteen compartments, the control unit is capable of functioning with either more or fewer compartments, and the command structure allows compartment numbers larger than fifteen to be transmitted. Hence the need for this type of response.

Note that the description of the document sorting aid as presented has included specific configurations in order to clarify certain details. It is intended that the invention include variations in details such as the number of sorting compartments, computer interface specifications, communications protocol between the control unit and computer, the size and shape of compartments of the sorting bin, methods of sweeping or unloading of the sorting bin, the arrangement and configuration of control switches and indicators, and functional implementation of the control unit. For instance, the computer interface might be altered to conform to RS-232C specifications, and the control unit might be assigned the task of maintaining counts of documents placed in each compartment and reporting these counts to the computer on command. The console might be configured to handle 18 compartments rather than 15, and such that full sorting bins are unloaded from the rear of the console rather than the side.

The control unit might be implemented with a microprocessor rather than random logic components.

Figure 4:
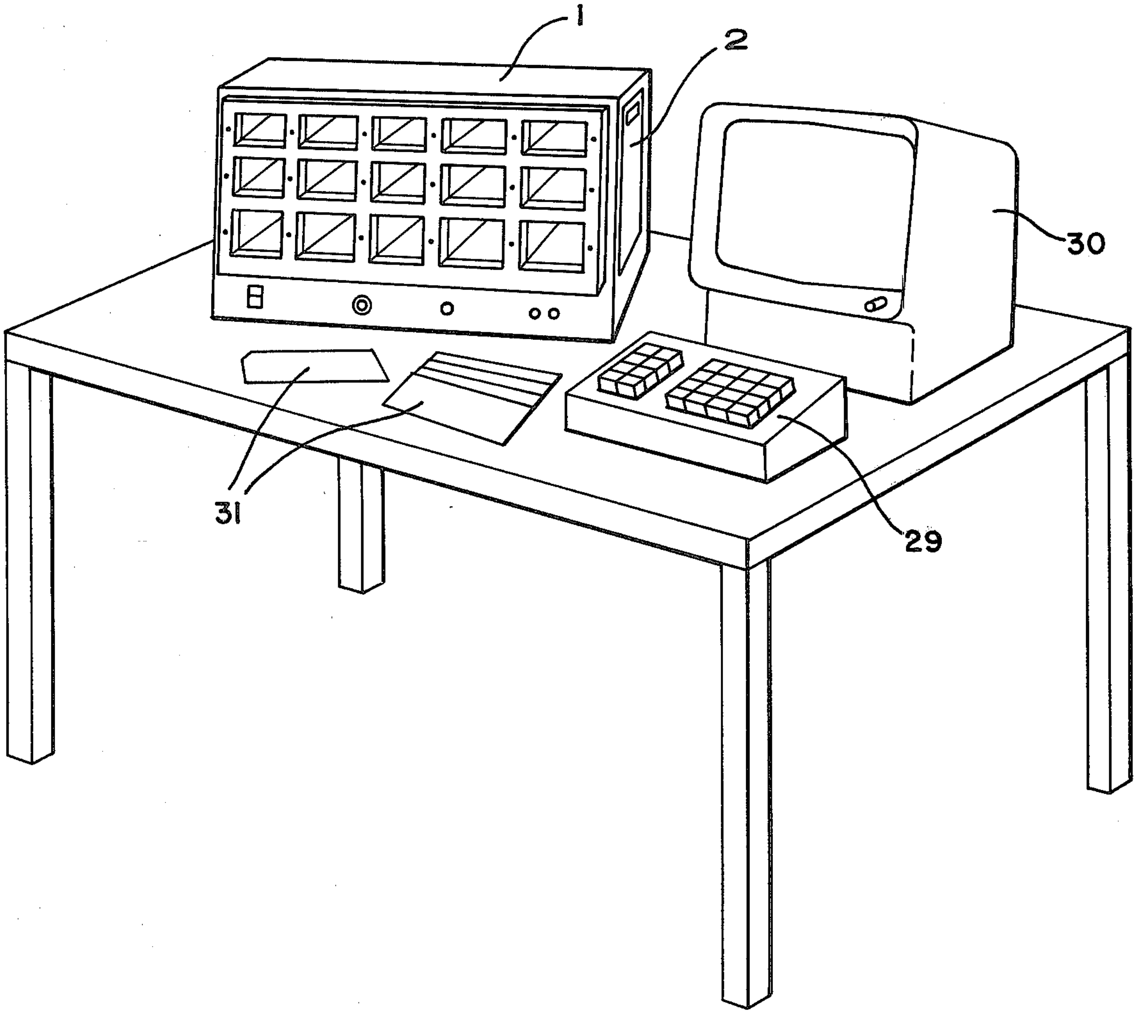
FIG. 4 depicts a typical environment for the invention when used to sort documents in conjunction with the data entry application of a data processing facility.

FIG. 4 illustrates a data entry station utilizing the document sorting aid. The data entry station consists of a standard typewriter-like keyboard 29 and a character display device 30 such as a CRT screen, in addition to the document sorting aid 1.

To illustrate, assume the documents 31 consist of airline ticket coupons representing sales receipts of ticket agents. Information such as ticket number, airline code, ticket sale price, commission code, and type of sale (cash or credit) is to be extracted from each coupon by the operator of the data entry station and entered into the computer for processing.

Documents 31 are received by the operator in batches from each ticket agent, and a single batch may contain coupons representing sales to several different airlines. After the required information is extracted from each coupon, the coupon must be routed to the airline for whom the sale was made. Thus the documents must be sorted by airline code.

The character display device 30, the keyboard 29, and the document sorting aid 1 are all connected to a computer. The computer is programmed to interface with this equipment and to accept data for processing. The operator is prompted via the character display device as each field of data is entered via the keyboard. The fields are edited for context and reasonableness as they are entered, and the operator is informed of errors detected with an appropriate message on the display device. The opportunity is provided for reentering fields which do not pass the computer edits.

To start a document entry, the computer prompts the operator to enter the airline code from the coupon as the first field. After the first field is entered, the computer prompts for entry of the second field, which might be any of other items listed such as ticket number, amount of sale, etc. As the second field is being entered, the computer checks the data entered for the first field against a list of valid airline codes. If the data entered is not a valid airline code, the computer terminates entry of the second field and directs the operator to reenter the first field. When a valid airline code has been entered, the computer determines the sorting aid compartment number assigned to the indicated airline from an internal table. A command is issued to the sorting aid to Select the compartment assigned to the airline. When the operator completes the entry of the last field of the coupon, the document is deposited in the proper compartment as determined by illuminated indicators on the sorting aid. The alarm is activated if the operator deposits the coupon in any compartment other than the one selected. When the coupon is deposited in the correct compartment, the compartment is cleared, and the system is ready for entry of data from the next coupon in the batch.

After the operator has entered and sorted several batches from various ticket agents, a control clerk replaces the full sorting bin with an empty bin and prepares the sorted documents for forwarding to the respective airlines. The computer directed manual sorting operation may now continue.

We claim:

1. A device for assisting in the manual sorting of items having distinguishing identifiers thereon, said identifiers differing amongst said items, said device comprising:

a. a plurality of compartments, each having an opening and the capability of holding a plurality of said items;

b. detecting means, coupled to said compartments and located in proximity to said openings of said compartments, for, when an item is placed in one of said compartments, providing a signal of a first type indicative of which of said compartments said item is placed in;

c. input means for receiving information relative to the identifier of an item and providing a signal of a second type indicative of said identifier;

d. directing means, coupled to said detecting means and to said input means, for receiving said signals of said first and second types and for:

1. providing a signal of a third type indicative of at least one particular compartment said particular item should be placed in upon the receipt of a signal of said second type indicative of the particular identifier of a particular item; and
2. providing a signal of a fourth type after providing said signal of said third type for said particular item and upon receipt of a signal of said first type indicating that an item has been placed in a compartment other than said particular compartment before an item has been placed in said particular compartment;

e. indicating means, coupled to said directing means, for receiving said signal of said third type and, upon receipt of said signal of said third type, providing a particular indication detectable by a person of said particular compartment into which said particular item should be placed; and f. warning means, coupled to said directing means, for receiving said signal of said fourth type and, upon receipt of said signal of said fourth type, producing a warning detectable by a person.

2. The device of claim 1 wherein said directing means, upon the receipt, after providing said signal of said third type indicative of said at least one particular compartment, of a signal of said first type indicating that an item has been placed in said particular compartment, ceases providing said signal of said third type and said indicating means ceases providing said particular indication.

3. The device of claim 2 wherein said indicating means includes a light located in proximity to the opening of said particular compartment, said light, when said indicating means provides said particular indication, assuming a different state than when said indicating means does not provide said particular indication.

4. The device of claim 3 wherein said input means includes manual means for allowing for the manual introduction of said information into said input means.

5. The device of claim 4 wherein said manual means includes a keyboard coupled to said directing means.

6. The device of claim 2 wherein said warning includes a light changing its state of being lit or a sound-producing mechanism creating a noise.

7. The device of claim 6 wherein said directing means further includes prevent means for, after receiving said signal of said second type indicative of said particular identifier, preventing said directing means from receiving a further signal of said second type until said directing means has received a signal of said first type indicating that an item has been placed in said particular compartment.

8. The device of claim 7 wherein said directing means provides a signal of a fifth type when, after receiving a signal of said second type indicative of said particular identifier and subsequently receiving a signal of said first type indicating that an item has been placed in said particular compartment, said directing means receives a further signal of said first type indicating that an item has been placed in one of said compartments before receiving a further signal of said first type indicative of an identifier of an item; said warning means is a first warning means; and said device further includes a second warning means coupled to said directing means for receiving said signal of said fifth type and, when in receipt of said signal of said fifth type, providing a warning detectable by a person.

9. The device of claim 8 wherein said directing means, when in receipt of a signal of said second type indicative of said particular identifier of said particular item, provides a signal of a third type indicative of exactly one particular compartment said particular item should be placed in.

10. The device of claim 2 further including first structural means for holding said plurality of compartments in a fixed spatial relationship relative to each other; a second structural means for holding said detecting means in a fixed spatial shape similar to the openings of said plurality of compartments; and coupling means for retaining said first and second structural means in a fixed spatial relationship with each other with said detecting means in proximity to the openings of said compartments, said coupling means allowing the removal of said compartments from the vicinity of said first structural means.

11. The device of claim 10 wherein said first structural means holds said compartments with said openings of said compartments separated by walls and said second structural means forms a grid similar in shape to the separations formed by said walls between said openings.

12. The device of claim 11 further including sensing means coupled to said first and second structural means for providing a signal of a sixth type when said coupling means retains said first and second structural means in said fixed spatial relationship.

13. The device of claim 12 wherein said plurality of compartments includes at least two compartments of different sizes.

14. The device of claim 2 wherein electronic logic means provides an electronic signal when said directing means, after receiving a signal of said second type indicative of the identifier of an individual item, cannot, from said identifier of said individual item, provide a signal of said third type indicative of a compartment said individual item should be placed in and a further warning means for receiving said electronic signal and, when in receipt of said electronic signal, providing a warning detectable by a person.

15. The device of claim 14 wherein said electronic logic means also includes register means for keeping a count of the items placed in each of said compartments.

16. The device of claim 15 wherein said items are transportation tickets, said identifiers of said items relate to transportation companies, and the tickets from a first transportation company as related by the identifier on said tickets are to be placed into a compartment different than the compartment into which are to be placed the tickets of a different transportation company as related by the identifiers on said tickets of said different transportation company.

17. The device of claim 16 wherein a programmable electronic computer forms part of said electronic logic means and said directing means.

18. The device of claim 2 including pulsing means coupled to said detecting means and to said directing means for intermittantly preventing the operation of said detecting means for predetermined periods of time, said periods of time being less than the time required to place one of said items in one of said compartments.

19. The device of claim 8 wherein said detecting means includes infrared emitters and sensors.

20. A method for sorting, with the aid of a sorting assisting device, items having distinguishing identifiers thereon, said identifiers differing amongst said items and said sorting assisting device having:

(1) directing means;

(2) input means, coupled to said directing means, for providing said directing means with a signal of a first type indicative of particular identifiers, (3) indicating means, coupled to said directing means, said directing means providing said indicating means, upon receipt of a signal of said first type, with a signal of a second type, said indicating means, upon receipt of a signal of said second type, providing a particular indication detectable to a person of which one of several compartments, each having an opening, an item should be placed in;

(4) detecting means, coupled to said directing means, located in proximity to said openings of said compartments and, when an item is placed in one of said compartments, providing to said directing means a signal of a third type indicative of which of said compartments an item has been placed in; and (5) warning means for producing a warning detectable by a person when, after said directing means has provided to said indicating means a signal of said second type indicating that an individual item should be placed in an individual compartment but said detecting means provides to said directing means a signal of said third type indicating that said individual item has been placed in a compartment other than said individual compartment prior to said detecting means providing to said directing means a signal of said third type indicating that an item has been placed in said individual compartment, said directing means provides to said warning means a signal of a fourth type, said warning means, upon receipt of a signal of said fourth type, producing a warning detectable by a person, said method comprising:

a. placing in said input means of said sorting assisting device information relative to the particular identifier of a particular item;
b. placing said particular item in one of said compartments;
c. placing said particular item in another of said compartments if, after the step of placing said particular item in one of said compartments, said warning means produces said warning;
d. repeating the immediately proceeding step if, after performing the immediately proceeding step, said warning means produces said warning;
e. placing in said input means further information relative to the identifier of a further item after placing said particular item in a compartment without said warning means producing said warning; and
f. repeating steps b through d above.

21. The method of claim 20 wherein said further information is placed in said input means only after said indicating means has ceased providing said particular indication.

22. The method of claim 21 wherein, after several items are placed in said compartments, said compartments are removed from the proximity of said detecting means and compartments without items are placed in said proximity to said detecting means.

23. The method of claim 21 wherein, with said items being airline tickets, said identifier and said information including data relative to the identity of airlines, and said directing means providing an indication perceptable to a person that information placed in said input means does not relate to an airline not acceptable to said directing means, if, after said information is placed in said input means, said directing means provides said indications, different information is placed in said input means prior to placing said particular item in a compartment.

* * * * *